(12) United States Patent
Brandwine

(10) Patent No.: US 9,189,343 B2
(45) Date of Patent: *Nov. 17, 2015

(54) FREQUENT DATA SET CAPTURES FOR VOLUME FORENSICS

(71) Applicant: Amazon Technologies, Inc., Reno, NV (US)

(72) Inventor: Eric Jason Brandwine, Haymarket, VA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/574,247

(22) Filed: Dec. 17, 2014

(65) Prior Publication Data

US 2015/0106338 A1    Apr. 16, 2015

Related U.S. Application Data

(63) Continuation of application No. 13/221,755, filed on Aug. 30, 2011, now Pat. No. 8,931,107.

(51) Int. Cl.
*G06F 17/30* (2006.01)
*G06F 11/14* (2006.01)
*G06F 7/04* (2006.01)

(52) U.S. Cl.
CPC ........ *G06F 11/1451* (2013.01); *G06F 11/1461* (2013.01); *G06F 17/30* (2013.01); *G06F 2201/82* (2013.01); *G06F 2201/84* (2013.01); *G06F 2201/855* (2013.01)

(58) Field of Classification Search
CPC ............ G06F 11/0727; G06F 11/0751; G06F 11/1458; G06F 11/1461; G06F 2201/82; G06F 11/1451; G06F 17/30; G06F 2201/84; G06F 2201/855
USPC ............. 726/26; 711/163, 161, 162; 709/219, 709/203, 223; 714/4.11
See application file for complete search history.

(56) References Cited

U.S. PATENT DOCUMENTS

| 8,438,247 B1 | 5/2013 | Certain et al. |
| 8,931,107 B1 * | 1/2015 | Brandwine ..................... 726/26 |
| 2003/0186715 A1 | 10/2003 | McGowan |

(Continued)

FOREIGN PATENT DOCUMENTS

| JP | 07-281933 A | 10/1995 |
| JP | 2003-223350 A | 8/2003 |

OTHER PUBLICATIONS

USPTO Notice of Allowance dated Sep. 18, 2014, for U.S. Appl. No. 13/221,755, filed Aug. 30, 2011, 8 pages.

(Continued)

*Primary Examiner* — Hong Kim
(74) *Attorney, Agent, or Firm* — Hogan Lovells US LLP

(57) ABSTRACT

Techniques, including systems and methods, take frequent captures of data sets for the purpose of forensic analysis. The data set captures are taken at the block level in various embodiments. Data set captures are used to instantiate forensic storage volumes that are attached to computing instances. The computing instances can access data in the forensic storage volumes at a state corresponding to a specified capture time. A user can select different capture times to re-instantiate the forensic storage volume to see how the forensic storage volume changed between captures.

20 Claims, 10 Drawing Sheets

(56) References Cited

U.S. PATENT DOCUMENTS

| | | |
|---|---|---|
| 2003/0217119 A1 | 11/2003 | Raman et al. |
| 2004/0073831 A1 | 4/2004 | Yanai et al. |
| 2005/0066222 A1 | 3/2005 | Rowan et al. |
| 2005/0240632 A1 | 10/2005 | Wong et al. |
| 2006/0005074 A1 | 1/2006 | Yanai et al. |
| 2006/0136932 A1 | 6/2006 | Bose et al. |
| 2006/0161732 A1 | 7/2006 | Murotani et al. |
| 2007/0260830 A1 | 11/2007 | Faibish et al. |
| 2008/0140910 A1 | 6/2008 | Flynn et al. |
| 2008/0162812 A1 | 7/2008 | Stroberger et al. |
| 2009/0019459 A1* | 1/2009 | Rowan et al. ............... 719/328 |
| 2010/0106645 A1* | 4/2010 | Peckover ..................... 705/50 |
| 2010/0281178 A1 | 11/2010 | Sullivan |
| 2011/0138138 A1 | 6/2011 | Ben-Dor et al. |
| 2012/0143899 A1 | 6/2012 | Arango et al. |
| 2012/0173577 A1 | 7/2012 | Millar et al. |
| 2012/0246640 A1 | 9/2012 | Marshall et al. |

OTHER PUBLICATIONS

USPTO Non-Final Office Action dated Mar. 14, 2014, for U.S. Appl. No. 13/221,755, filed Aug. 30, 2011, 12 pages.

USPTO Notice of Allowance dated Jan. 18, 2013, for U.S. Appl. No. 12/975,269, filed Dec. 21, 2010, 5 pages.

USPTO Non-Final Office Action dated Aug. 6, 2012, for U.S. Appl. No. 12/975,269, filed Dec. 21, 2010, 14 pages.

PCT International Search Report and Written Opinion mailed Apr. 20, 2012, for International Application No. PCT/US2011/65869 filed Dec. 19, 2011.

* cited by examiner

FREQUENT DATA SET CAPTURES FOR VOLUME FORENSICS

CROSS REFERENCE TO RELATED APPLICATIONS

This application is a continuation of U.S. patent application Ser. No. 13/221,755, entitled "TECHNIQUES FOR GENERATING BLOCK LEVEL DATA CAPTURES" filed Aug. 30, 2011, now U.S. Pat. No. 8,931,107, which is incorporated herein by reference for all purposes. This application incorporates by reference the full disclosure of U.S. application Ser. No. 12/975,269 entitled "TECHNIQUES FOR CAPTURING DATA SETS," and filed on Dec. 21, 2010, now U.S. Pat. No. 8,438,247.

BACKGROUND

Computing resources, including networked computing environments, continue to grow in terms of both the number and type of computing components, as well as the complexity of component arrangements in the computing environments. Various innovations make larger and more powerful computing systems available to increasing numbers of users. Distributed computing services, for example, allow users to utilize computing resources maintained by others without having to make large hardware investments. While the growth in complexity and availability of such computing resources generally proves quite useful for a wide variety of purposes, this growth also introduces additional issues.

Increased complexity in computing resources, in many instances, increases the likelihood of problems arising due to malfunction, software bugs, incorrect configurations, and the like. With distributed computing services operated by a third party, for example, a customer can sometimes utilize the third party's resources in a way that adversely affects others, either maliciously or inadvertently. The customer can, for instance, make a programming error that causes excessive use of bandwidth and, therefore, makes less bandwidth available for use by other customers. In some instances, the customer may intentionally use the third party resources to cause harm to others with viruses, denial of service (DoS) attacks, and the like. Generally, advances in computing technology create many opportunities in all computing environments for problems to arise.

BRIEF DESCRIPTION OF THE DRAWINGS

Various embodiments in accordance with the present disclosure will be described with reference to the drawings, in which.

DETAILED DESCRIPTION

Figure 1:
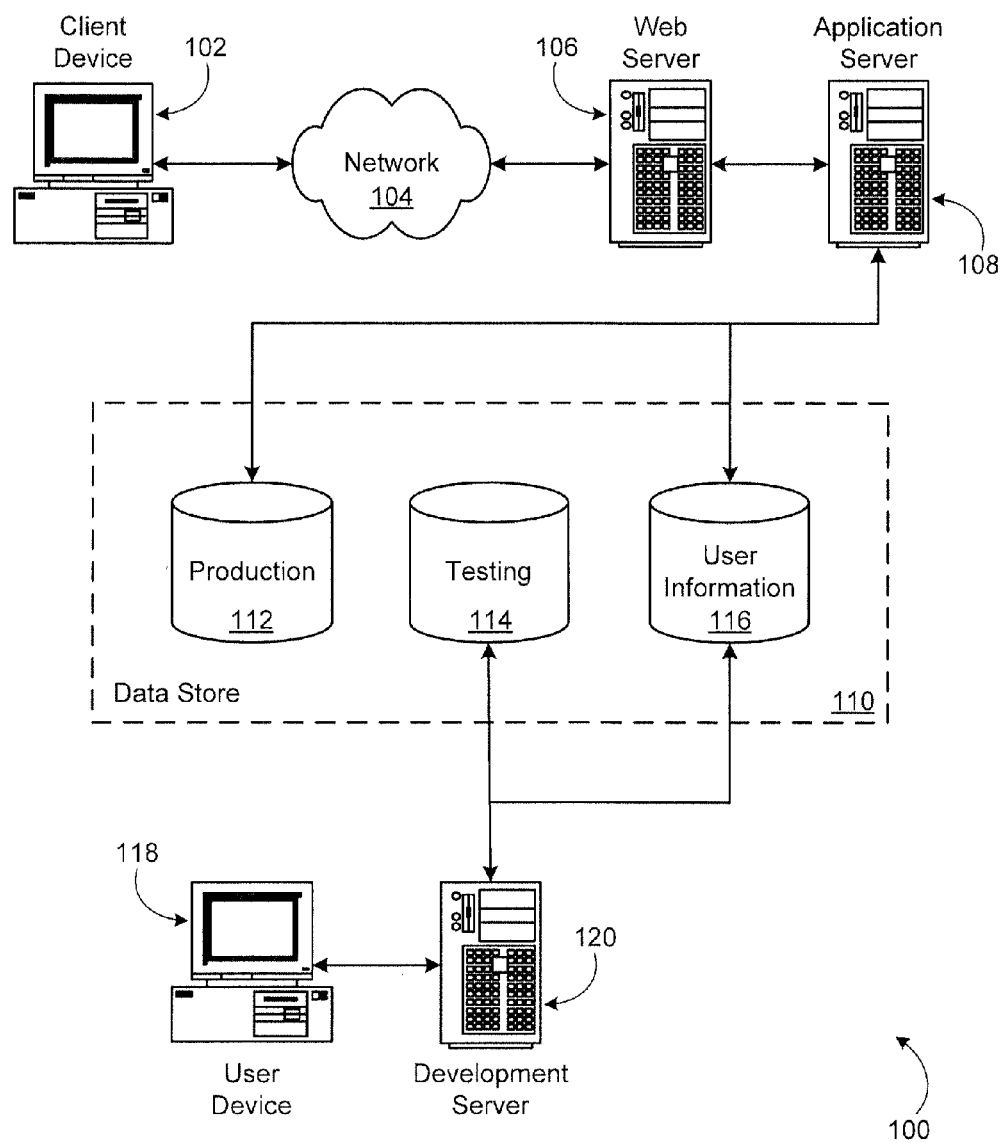
FIG. 1 is a schematic diagram illustrating aspects of an example environment for implementing aspects in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques, including systems and methods, of the present disclosure provide novel tools enabling forensic analysis of computing resources. In an embodiment, frequent captures of data sets at the block level are taken and at least a portion of the captures are maintained for forensic use. A capture is a representation of a data set at a point in time. A capture may include information from which the data set may be reconstructed at a later time and/or may include the data set itself. The data set may be in the form of a set of data blocks where each data block is a sequence of bytes or bits having a nominal length. The blocks may be stored by a block storage device which may be a physical storage device or a virtual storage device. The blocks of a data set may be stored on a single physical data store, such as a hard disk, or collectively by a plurality of physical data stores. The blocks of the data set may comprise a storage volume of an operating system and may be further organized according to a file system.

Captures of a data set may take various forms. In some embodiments, for example, each capture may include all of the data of the data set at a corresponding capture time. As another example, in some embodiments, different captures of the same data set may share information that is stored commonly for the captures. For example, with respect to data from a captured data set, a capture may only include information for the data set that has changed since the last capture. As yet another example, various journaling techniques may be used to take captures. For example, a journal of write operations (writes) to a data set may be logged in a write journal, where a write operation is a change in the bits of a block or set of blocks. Each entry in the journal may indicate a timestamp for the write or set of writes, such as every n writes, for some positive integer n. The write journal may be a circular buffer, where, after a point in time, every new entry takes the place of the oldest entry, or may be allowed to grow without bound. In this manner, from a particular point of time in the data set's evolution, the journal may be used to reconstruct the data to another time in the data set's evolution. For example, writes from the write journal may be written to the data set to put the data set into a state corresponding to another point in time. Writes from the write journal may be used to undo writes that were made to the data set to put the data set into a state corresponding to an earlier point in time. In this manner, each entry in a write journal corresponds to a capture of the data set. If an entry to the journal is made for every write, every entry of the journal would then correspond to a capture of the data set and, therefore, there is a capture for every mutation of the data set. If an entry to the journal is made for every set of n writes, an entry of the journal would then correspond to a capture of the data set for every n mutations of the data set.

In an embodiment, captures of a data set are used to forensically analyze the data set. The data set may be analyzed for various reasons, such as to investigate security-related events, application testing, and, generally, for any reason a user may wish to analyze how the data set changes with time. In an embodiment, forensic analysis of the data set is enabled by creating a forensic storage volume that stores the data set in a state corresponding to a specified capture time. The capture time may be a user-specified time or may be otherwise specified. For example, automated techniques may be used to detect a security event or other event. The time of a capture taken near the time of the detected event may be the specified capture time. In an embodiment, the forensic storage volume is attached to a computing instance, which may be a physical or virtual computer system. The computing instance may be configured for use with the forensic storage volume, for example, by programming the computing instance to ensure that a disk cache for the forensic storage volume is consistent with any changes made to the forensic storage volume to correspond to a different capture time.

When the forensic storage volume is attached to the computing instance, the computing volume may be used by a user to analyze the contents of the data set at the capture time. The user may also roll the data set backward or forward in time to correspond to other captures and analyze the changes to the data set that were made over time. Use of the computing instance may be provided in various ways. For example, the forensic storage volume may be attached to a computing device of the user, that is, in the physical presence of the user. The forensic storage volume may be attached to a computing instance at a location remote from the user, such as a remote data center, and the user may access the computing instance over a communications network such as the Internet. A web service or other application programming interface (API) may be used by the user to access the computing instance.

With access to the computing instance, the user may utilize an interface to roll the forensic storage volume forward and/or backward in time to view how the data set in the forensic storage volume evolved over time. A graphical user interface (GUI) may be provided to the user to enable the user to utilize intuitive graphical controls, such as a slider thumb on a timeline, to select a capture time for the data set. More sophisticated tools may be provided to the user. For instance, with knowledge of a file system used to organize the data set, the user may be provided information that identifies which file or files of the file system were affected by mutations to the data set between captures. Other variations, including those discussed below, are also considered as being within the scope of the present disclosure.

Various approaches may be implemented in various environments for various applications. For example, FIG. 1 illustrates aspects of an example environment 100 for implementing aspects in accordance with various embodiments. As will be appreciated, although a Web-based environment may be utilized for purposes of explanation, different environments may be utilized, as appropriate, to implement various embodiments. The environment 100 shown includes both a testing or a development portion (or side) and a production portion. The production portion includes an electronic client device 102, which may include any appropriate device operable to send and receive requests, messages, or information over an appropriate network 104 and convey information back to a user of the device 102. Examples of such client devices include personal computers, cell phones, handheld messaging devices, laptop computers, tablet computers, settop boxes, personal data assistants, electronic book readers, and the like.

The network 104 may include any appropriate network, including an intranet, the Internet, a cellular network, a local area network, a wide area network, a wireless data network, or any other such network or combination thereof. Components utilized for such a system may depend at least in part upon the type of network and/or environment selected. Protocols and components for communicating via such a network are well known and will not be discussed herein in detail. Communication over the network may be enabled by wired or wireless connections, and combinations thereof. In this example, the network 104 includes the Internet, as the environment includes a Web server 106 for receiving requests and serving content in response thereto, although for other networks an alternative device serving a similar purpose could be utilized as would be apparent to one of ordinary skill in the art.

The illustrative environment 100 includes at least one application server 108 and a data store 110. It should be understood that there may be several application servers, layers, or other elements, processes, or components, which may be chained or otherwise configured, which may interact to perform tasks such as obtaining data from an appropriate data store. As used herein the term "data store" refers to any device or combination of devices capable of storing, accessing, and/or retrieving data, which may include any combination and number of data servers, databases, data storage devices, and data storage media, in any standard, distributed, or clustered environment.

The application server 108 may include any appropriate hardware and software for integrating with the data store as needed to execute aspects of one or more applications for the client device 102, and may even handle a majority of the data access and business logic for an application. The application server 108 provides access control services in cooperation with the data store 110, and is able to generate content such as text, graphics, audio, and/or video to be transferred to the user, which may be served to the user by the Web server 106 in the form of HTML, XML, or another appropriate structured language in this example.

The handling of all requests and responses, as well as the delivery of content between the client device 102 and the application server 108, may be handled by the Web server 106. It should be understood that the Web and application servers 106, 108 are not required and are merely example components, as structured code discussed herein may be executed on any appropriate device or host machine as discussed elsewhere herein. Further, the environment 100 may be architected in such a way that a test automation framework may be provided as a service to which a user or application may subscribe. A test automation framework may be provided as an implementation of any of the various testing patterns discussed herein, although various other implementations may be utilized as well, as discussed or suggested herein.

The environment 100 may also include a development and/or testing side, which includes a user device 118 allowing a user such as a developer, data administrator, or tester to access the system. The user device 118 may be any appropriate device or machine, such as is described above with respect to the client device 102. The environment 100 may also include a development server 120, which functions similar to the application server 108 but typically runs code during development and testing before the code is deployed and executed on the production side and becomes accessible to outside users, for example. In some embodiments, an application server may function as a development server, and separate production and testing storage may not be utilized.

The data store 110 may include several separate data tables, databases, or other data storage mechanisms and media for storing data relating to a particular aspect. For example, the data store 110 illustrated includes mechanisms for storing production data 112 and user information 116, which may be utilized to serve content for the production side. The data store 110 also is shown to include a mechanism for storing testing data 114, which may be utilized with the user information for the testing side. It should be understood that there may be many other aspects that are stored in the data store 110, such as for page image information and access right information, which may be stored in any of the above listed mechanisms as appropriate or in additional mechanisms in the data store 110.

The data store 110 is operable, through logic associated therewith, to receive instructions from the application server 108 or development server 120, and obtain, update, or otherwise process data in response thereto. In one example, a user might submit a search request for a certain type of item. In this case, the data store 110 might access the user information 116 to verify the identity of the user, and may access the catalog detail information to obtain information about items of that type. The information then may be returned to the user, such as in a results listing on a Web page that the user is able to view via a browser on the user device 102. Information for a particular item of interest may be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment 100 in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

Figure 2:
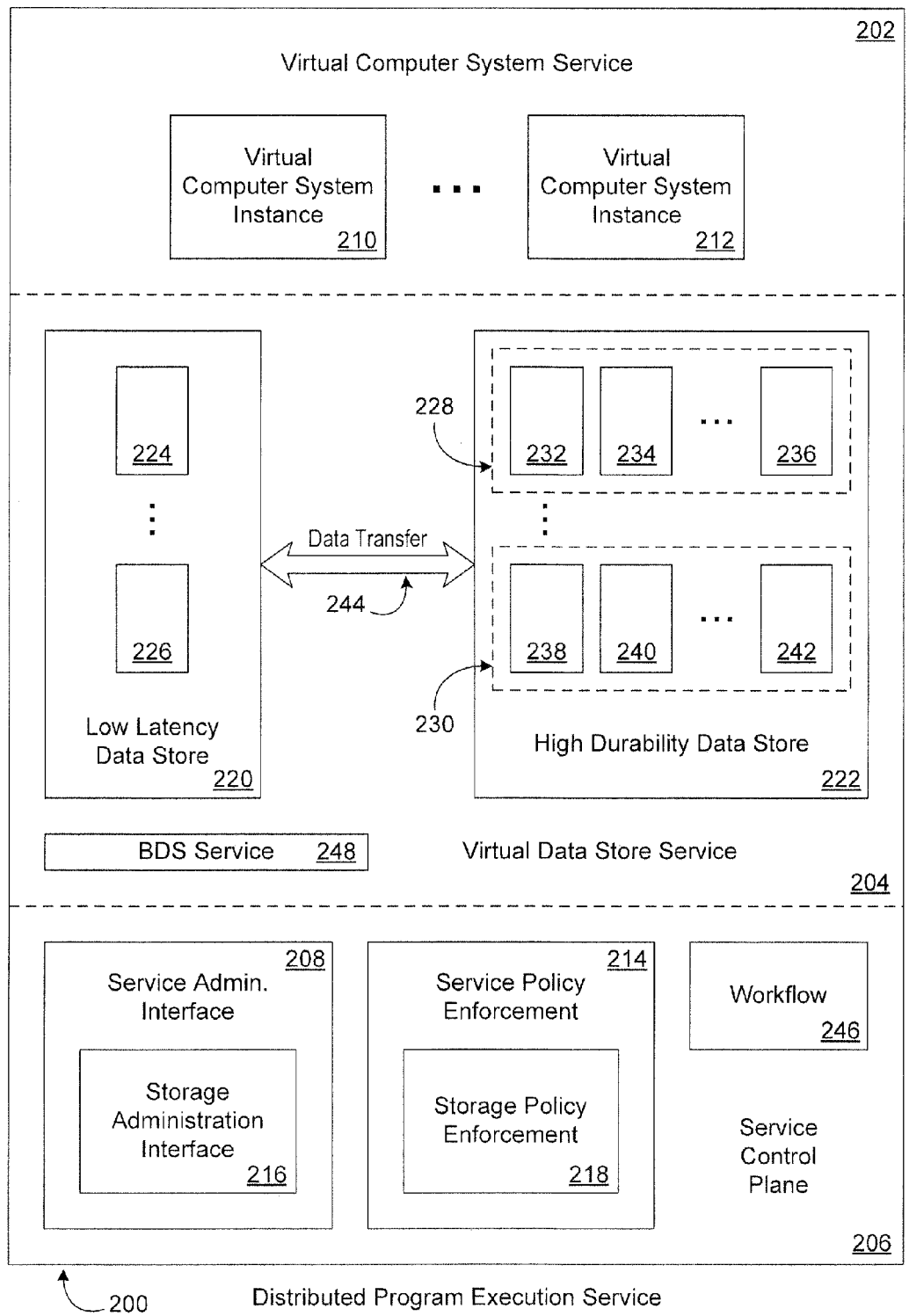
FIG. 2 is a schematic diagram depicting aspects of an example program execution service in accordance with at least one embodiment.

In at least one embodiment, one or more aspects of the environment 100 may incorporate and/or be incorporated into a distributed program execution service. FIG. 2 depicts aspects of an example distributed program execution service 200 in accordance with at least one embodiment. The distributed program execution service 200 provides virtualized computing services, including a virtual computer system service 202 and a virtual data store service 204, with a wide variety of computing resources interlinked by a relatively high speed data network. Such computing resources may include processors such as central processing units (CPUs), volatile storage devices such as random access memory (RAM), nonvolatile storage devices such as flash memory, hard drives and optical drives, servers such as the Web server 106 and the application server 108 described above with reference to FIG. 1, one or more data stores such as the data store 110 of FIG. 1, as well as communication bandwidth in the interlinking network. The computing resources managed by the distributed program execution service 200 are not shown explicitly in FIG. 2 because it is an aspect of the distributed program execution service 200 to emphasize an independence of the virtualized computing services from the computing resources that implement them.

The distributed program execution service 200 may utilize the computing resources to implement the virtualized computing services at least in part by executing one or more programs, program modules, program components and/or programmatic objects (collectively, "program components") including and/or compiled from instructions and/or code specified with any suitable machine and/or programming language. For example, the computing resources may be allocated, and reallocated as necessary, to facilitate execution of the program components, and/or the program components may be assigned, and reassigned as necessary, to the computing resources. Such assignment may include physical relocation of program components, for example, to enhance execution efficiency. From a perspective of a user of the virtualized computing services, the distributed program execution service 200 may supply computing resources elastically and/or on-demand, for example, associated with a per resource unit commodity-style pricing plan.

The distributed program execution service 200 may further utilize the computing resources to implement a service control plane 206 configured at least to control the virtualized computing services. The service control plane 206 may include a service administration interface 208. The service administration interface 208 may include a Web-based user interface configured at least to enable users and/or administrators of the virtualized computing services to provision, de-provision, configure and/or reconfigure (collectively, "provision") suitable aspects of the virtualized computing services. For example, a user of the virtual computer system service 202 may provision one or more virtual computer system instances 210, 212. The user may then configure the provisioned virtual computer system instances 210, 212 to execute the user's application programs. The ellipsis between the virtual computer system instances 210 and 212 indicates that the virtual computer system service 202 may support any suitable number (e.g., thousands, millions, and more) of virtual computer system instances although, for clarity, only two are shown.

The service administration interface 208 may further enable users and/or administrators to specify and/or re-specify virtualized computing service policies. Such policies may be maintained and enforced by a service policy enforcement component 214 of the service control plane 206. For example, a storage administration interface 216 portion of the service administration interface 208 may be utilized by users and/or administrators of the virtual data store service 204 to specify virtual data store service policies to be maintained and enforced by a storage policy enforcement component 218 of the service policy enforcement component 214. Various aspects and/or facilities of the virtual computer system service 202 and the virtual data store service 204 including the virtual computer system instances 210, 212, the low latency data store 220, the high durability data store 222, and/or the underlying computing resources may be controlled with interfaces such as application programming interfaces (APIs) and/or Web-based service interfaces. In at least one embodiment, the control plane 206 further includes a workflow component 246 configured at least to interact with and/or guide interaction with the interfaces of the various aspects and/or facilities of the virtual computer system service 202 and the virtual data store service 204 in accordance with one or more workflows.

In at least one embodiment, service administration interface 208 and/or the service policy enforcement component 214 may create, and/or cause the workflow component 246 to create, one or more workflows that are then maintained by the workflow component 246. Workflows, such as provisioning workflows and policy enforcement workflows, may include one or more sequences of tasks to be executed to perform a job, such as provisioning or policy enforcement. A workflow, as the term is used herein, is not the tasks themselves, but a task control structure that may control flow of information to and from tasks, as well as the order of execution of the tasks it controls. For example, a workflow may be considered a state machine that can manage and return the state of a process at any time during execution. Workflows may be created from workflow templates. For example, a provisioning workflow may be created from a provisioning workflow template configured with parameters by the service administration interface 208. As another example, a policy enforcement workflow may be created from a policy enforcement workflow template configured with parameters by the service policy enforcement component 214.

The workflow component 246 may modify, further specify and/or further configure established workflows. For example, the workflow component 246 may select particular computing resources of the distributed program execution service 200 to execute and/or be assigned to particular tasks. Such selection may be based at least in part on the computing resource needs of the particular task as assessed by the workflow component 246. As another example, the workflow component 246 may add additional and/or duplicate tasks to an established workflow and/or reconfigure information flow between tasks in the established workflow. Such modification of established workflows may be based at least in part on an execution efficiency analysis by the workflow component 246. For example, some tasks may be efficiently performed in parallel, while other tasks depend on the successful completion of previous tasks.

The virtual data store service 204 may include multiple types of virtual data store such as a low latency data store 220 and a high durability data store 222. For example, the low latency data store 220 may maintain one or more data sets 224, 226 which may be read and/or written (collectively, "accessed") by the virtual computer system instances 210, 212 with relatively low latency. The ellipsis between the data sets 224 and 226 indicates that the low latency data store 220 may support any suitable number (e.g., thousands, millions, and more) of data sets although, for clarity, only two are shown. For each data set 224, 226 maintained by the low latency data store 220, the high durability data store 222 may maintain a set of captures 228, 230. Each set of captures 228, 230 may maintain any suitable number of captures 232, 234, 236 and 238, 240, 242 of its associated data set 224, 226, respectively, as indicated by the ellipses. Each capture 232, 234, 236 and 238, 240, 242 may provide a representation of the respective data set 224 and 226 at particular moment in time. Such captures 232, 234, 236 and 238, 240, 242 may be utilized for later inspection including restoration of the respective data set 224 and 226 to its state at the captured moment in time. Although each component of the distributed program execution service 200 may communicate utilizing the underlying network, data transfer 244 between the low latency data store 220 and the high durability data store 222 is highlighted in FIG. 2 because the contribution to utilization load on the underlying network by such data transfer 244 can be significant.

For example, the data sets 224, 226 of the low latency data store 220 may be virtual disk files (i.e., file(s) that can contain sequences of bytes that represents disk partitions and file systems) or other logical volumes. The low latency data store 220 may include a low overhead virtualization layer providing access to underlying data storage hardware. For example, the virtualization layer of the low latency data store 220 may be low overhead relative to an equivalent layer of the high durability data store 222. Systems and methods for establishing and maintaining low latency data stores and high durability data stores in accordance with at least one embodiment are known to those of skill in the art, so only some of their features are highlighted herein. In at least one embodiment, the sets of underlying computing resources allocated to the low latency data store 220 and the high durability data store 222, respectively, are substantially disjoint. In a specific embodiment, the low latency data store 220 could be a Storage Area Network target or the like. In this exemplary embodiment, the physical computer system that hosts the virtual computer system instance 210, 212 can send read/write requests to the SAN target.

The low latency data store 220 and/or the high durability data store 222 may be considered non-local and/or independent with respect to the virtual computer system instances 210, 212. For example, physical servers implementing the virtual computer system service 202 may include local storage facilities such as hard drives. Such local storage facilities may be relatively low latency but limited in other ways, for example, with respect to reliability, durability, size, throughput and/or availability. Furthermore, data in local storage allocated to particular virtual computer system instances 210, 212 may have a validity lifetime corresponding to the virtual computer system instance 210, 212, so that if the virtual computer system instance 210, 212 fails or is de-provisioned, the local data is lost and/or becomes invalid. In at least one embodiment, data sets 224, 226 in non-local storage may be efficiently shared by multiple virtual computer system instances 210, 212. For example, the data sets 224, 226 may be mounted by the virtual computer system instances 210, 212 as virtual storage volumes.

Data stores in the virtual data store service 204, including the low latency data store 220 and/or the high durability data store 222, may be facilitated by and/or implemented with a block data storage (BDS) service 248, at least in part. The BDS service 248 may facilitate the creation, reading, updating and/or deletion of one or more block data storage volumes, such as virtual storage volumes, with a set of allocated computing resources including multiple block data storage servers. A block data storage volume, and/or the data blocks thereof, may be distributed and/or replicated across multiple block data storage servers to enhance volume reliability, latency, durability and/or availability. As one example, the multiple server block data storage systems that store block data may in some embodiments be organized into one or more pools or other groups that each have multiple physical server storage systems co-located at a geographical location, such as in each of one or more geographically distributed data centers, and the program(s) that use a block data volume stored on a server block data storage system in a data center may execute on one or more other physical computing systems at that data center.

The BDS service 248 may facilitate and/or implement local caching of data blocks as they are transferred through the underlying computing resources of the distributed program execution service 200 including local caching at data store servers implementing the low latency data store 220 and/or the high durability data store 222, and local caching at virtual computer system servers implementing the virtual computer system service 202. In at least one embodiment, the high durability data store 222 is an archive quality data store implemented independent of the BDS service 248. The high durability data store 222 may work with sets of data that are large relative to the data blocks manipulated by the BDS service 248. The high durability data store 222 may be implemented independent of the BDS service 248. For example, with distinct interfaces, protocols and/or storage formats.

Each data set 224, 226 may have a distinct pattern of change over time. For example, the data set 224 may have a higher rate of change than the data set 226. However, in at least one embodiment, bulk average rates of change insufficiently characterize data set change. For example, the rate of change of the data set 224, 226 may itself have a pattern that varies with respect to time of day, day of week, seasonally including expected bursts correlated with holidays and/or special events, and annually. Different portions of the data set 224, 266 may be associated with different rates of change, and each rate of change "signal" may itself be composed of independent signal sources, for example, detectable with Fourier analysis techniques. Any suitable statistical analysis techniques may be utilized to model data set change patterns including Markov modeling and Bayesian modeling.

As described above, an initial capture 232 of the data set 224 may involve a substantially full copy of the data set 224 and transfer 244 through the network to the high durability data store 222 (may be a "full capture"). In a specific example, this may include taking a snapshot of the blocks that make up a virtual storage volume. Data transferred between the low latency data store 220 and high durability data store 222 may be orchestrated by one or more processes of the BDS service 248. As another example, a virtual disk (storage volume) may be transferred to a physical computer hosting a virtual computer system instance 210. A hypervisor may generate a write log that describes the data and location where the virtual computer system instance 210 writes the data. The write log may then be stored by the high durability data store 222 along with an image of the virtual disk when it was sent to the physical computer.

The data set 224 may be associated with various kinds of metadata. Some, none or all of such metadata may be included in a capture 232, 234, 236 of the data set 224 depending on the type of the data set 224. For example, the low latency data store 220 may specify metadata to be included in a capture depending on its cost of reconstruction in a failure recovery scenario. Captures 234, 236 beyond the initial capture 232 may be "incremental", for example, involving a copy of changes to the data set 224 since one or more previous captures. Changes to a data set may also be recorded by a group of differencing virtual disks which each comprise a set of data blocks. Each differencing virtual disk may be a parent and/or child differencing disk. A child differencing disk may contain data blocks that are changed relative to a parent differencing disk. Captures 232, 234, 236 may be arranged in a hierarchy of classes, so that a particular capture may be incremental with respect to a sub-hierarchy of capture classes (e.g., a capture scheduled weekly may be redundant with respect to daily captures of the past week, but incremental with respect to the previous weekly capture). Depending on the frequency of subsequent captures 234, 236, utilization load on the underlying computing resources can be significantly less for incremental captures compared to full captures.

For example, a capture 232, 234, 236 of the data set 224 may include read access of a set of servers and/or storage devices implementing the low latency data store 220, as well as write access to update metadata, for example, to update a data structure tracking "dirty" data blocks of the data set 224. For the purposes of this description, data blocks of the data set 224 are dirty (with respect to a particular class and/or type of capture) if they have been changed since the most recent capture (of the same class and/or type). Prior to being transferred 244 from the low latency data store 220 to the high durability data store 222, capture 232, 234, 236 data may be compressed and/or encrypted by the set of servers. At the high durability data store 222, received capture 232, 234, 236 data may again be written to an underlying set of servers and/or storage devices. Thus each capture 232, 234, 236 involves a load on finite underlying computing resources including server load and network load. It should be noted that, while illustrative embodiments of the present disclosure discuss storage of captures in the high durability data store 222, captures may be stored in numerous ways. Captures may be stored in any data store capable of storing captures including, but not limited to, low-latency data stores and the same data stores that store the data being captured.

Captures 232, 234, 236 of the data set 224 may be manually requested, for example, utilizing the storage administration interface 216. In at least one embodiment, the captures 232, 234, 236 may be automatically scheduled in accordance with a data set capture policy. Data set capture policies in accordance with at least one embodiment may be specified with the storage administration interface 216, as well as associated with one or more particular data sets 224, 226. The data set capture policy may specify a fixed or flexible schedule for data set capture. Fixed data set capture schedules may specify captures at particular times of day, days of the week, months of the year, and/or any suitable time and date. Fixed data set capture schedules may include recurring captures (e.g., every weekday at midnight, every Friday at 2 am, 4 am every first of the month) as well as one-off captures.

Flexible data set capture policies may specify that a capture is to occur within a particular time window (e.g., 2 am-6 am everyday, sometime on Sunday, after close of business on the last day of the month) or with a particular frequency (e.g., once per hour, twice per day, once per week, once per month). In at least one embodiment, flexible data set capture policies may specify that captures be scheduled to meet suitable goals, targets and/or conditions (collectively, "capture conditions"). For example, each capture 232, 234, 236 may have an associated cost, financially and/or in terms of computational resources, and the flexible data set capture policy may specify a cost target and/or cost cap for the capture 232, 234, 236 or set of captures 228 including a budget per time period and/or an average cost per capture. As another example, in at least one embodiment, a probability of data loss of a portion of a data set 224 is a function at least of an amount of uncaptured data in the data set 224 at a given time. Accordingly, a flexible data set capture policy may specify a target probability of data loss of a portion of the data set 224, and the storage policy enforcement component 218 may schedule captures of the data set 224 to meet the target by keeping the amount of uncaptured data in the data set 224 below an associated uncaptured data target and/or cap.

Data set capture policies may specify any suitable combination of fixed schedules, flexible schedules, and capture conditions. Data set capture policies may further specify capture lifetimes and/or capture retention goals, targets and/or conditions. For example, a seven day lifetime may be specified for daily captures, a four week lifetime may be specified for weekly captures, and/or an annual lifetime may be specified for monthly captures. Captures may have an unspecified and/or unlimited lifetime, thus requiring manual deletion. Furthermore, particular captures may be protected, for example, may require manual deletion by a designated set of authenticated users. Captures 232, 234, 236 and/or capture sets 228, 230 may be associated with costs (e.g., a periodic fee for storage per gigabyte), and the data set capture policy may specify that captures 232, 234, 236 be automatically deleted to meet a cost target and/or cap. Enforcement of data capture retention policies may analyze associated capture sets 228, 230 to prioritize deletion of redundant captures and/or prohibit deletion of a capture that would prevent restoration of the data set 224 to its state in time corresponding to the most recent capture 232.

Figure 3:
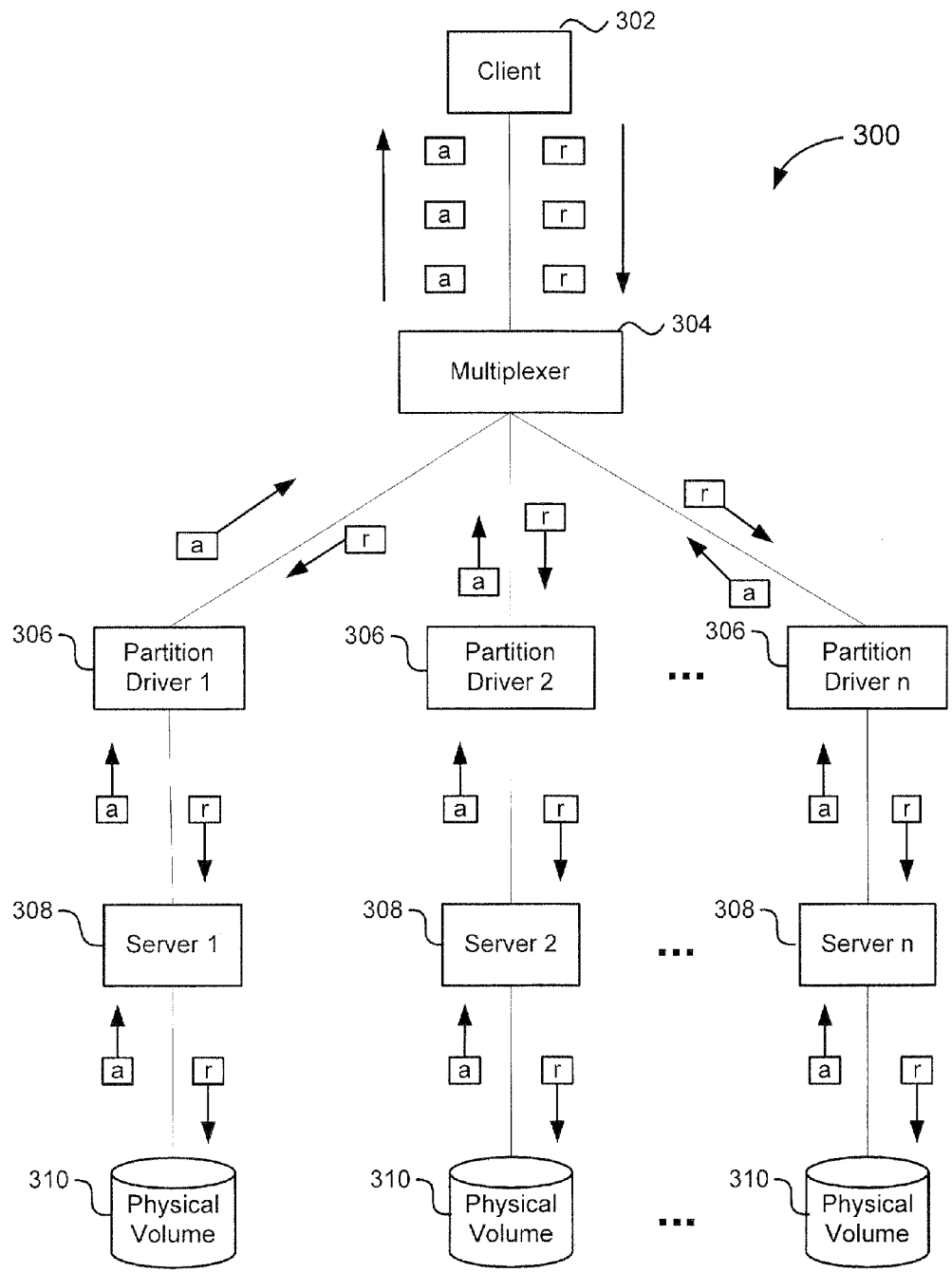
FIG. 3 shows a schematic diagram depicting aspects of an example virtual block storage service in accordance with at least one embodiment.

FIG. 3 shows a schematic diagram 300 of an environment in which captures may be recorded, in accordance with an embodiment. In this example, a client 302 operates in accordance with a set of executable instructions. The client may be a computing device, such as a computing device described above, or a module operating on a computing device. In an embodiment, the client 302 utilizes, creates, and otherwise uses data in its operations. In an embodiment, as the client 302 operates, the client generates a plurality of requests for performing data operations, such as creation operations, read operations, updating operations, and deletion operations in connection with data stored in a logical volume, where a logical volume can contain a data set that is physically stored in one or more physical storage devices. In this example, as discussed more below, the local volume used by the client device 302 is served by a plurality of physical volumes. The physical storage devices may be block storage devices or other storage devices. Also, when the data set is stored in multiple physical storage devices, the physical storage devices may be distributed among a plurality of locations, such as locations in a common data center and/or different geographic locations. Thus, from the point of view of the client 302, requests to perform data operations are made with respect to a logical volume regardless or how many physical volumes are used to store the data set. The client 302 may or may not be able to identify and/or specify information identifying the physical storage devices themselves.

As the client 302 makes various requests to perform data operations, the client sends a plurality of requests to a multiplexer 304, where a multiplexer is a computing device or module that distributes requests from the client 302 appropriately so that the requests may be fulfilled, as described below. In this example, the requests are represented by boxes containing the letter "r". The requests may be web service requests made to the multiplexer 304 or intermediate system between the multiplexer 304 and the client 302, although, generally, the requests may be made in any suitable manner according to any suitable protocol.

In an embodiment, when the multiplexer 304 receives a request from the client 302, the multiplexer 304 distributes the request to an appropriate partition driver 306, where a partition driver may be a module operable to communicate the request to a server 308 that has access to a physical data store 310. The multiplexer 304 and partition drivers 306 may be executed as part of a common device such that communications between the multiplexer 304 and partition drivers 306 are performed in memory and, therefore, relatively quickly. However the multiplexer 304 and one or more partition drivers 306 may be distributed on a network. In addition, while, for the purpose of illustration, requests at each level in the diagram 300 are shown identically, requests may be translated into different formats to accommodate different components receiving the requests. For example, a request from the client 302 to the multiplexer 304 may be in one format while information corresponding to that request from the multiplexer 304 to a partition driver 306 may be in another format.

In an embodiment, when data operations requested by the client 302 are performed, the acknowledgments of completion of the operation are sent from a physical volume 310 where the operation was performed to the client 302, as shown in the diagram 300 by a box containing the letter "a". As with the requests, acknowledgements may be in different formats when being communicated from one component to another. Also, while, for the purpose of illustration, the diagram 300 shows each server 308 communicating with a single physical volume 310, a server may communicate with multiple physical volumes and portions of a data set accessed by the client 302 and may be stored in one or more physical volumes in communication with a server.

As discussed, various embodiments of the present disclosure provide techniques for utilizing block-level captures of data sets stored using block storage devices, which can include, for example, physical block storage devices and/or virtualized block storage devices. A virtualized block device is an example of a computing resource that can be offered as a computing service. Users of virtualized volumes may create, delete, resize and otherwise reconfigure virtual volumes without concern for the details of how underlying computing resources are allocated. Users may also capture data sets stored in a virtual file system, where a capture of a data set is a representation of a data set at a moment in time. Multiple captures of a particular data set may be taken at various moments in time, and later captures may depend on one or more earlier captures. For example, an initial capture of the data set may involve making a full copy of the data set, whereas a later capture of the data set may involve copying data that has changed since an earlier capture. When needed for various reasons, captures may be reconstituted into volumes.

Figure 4:
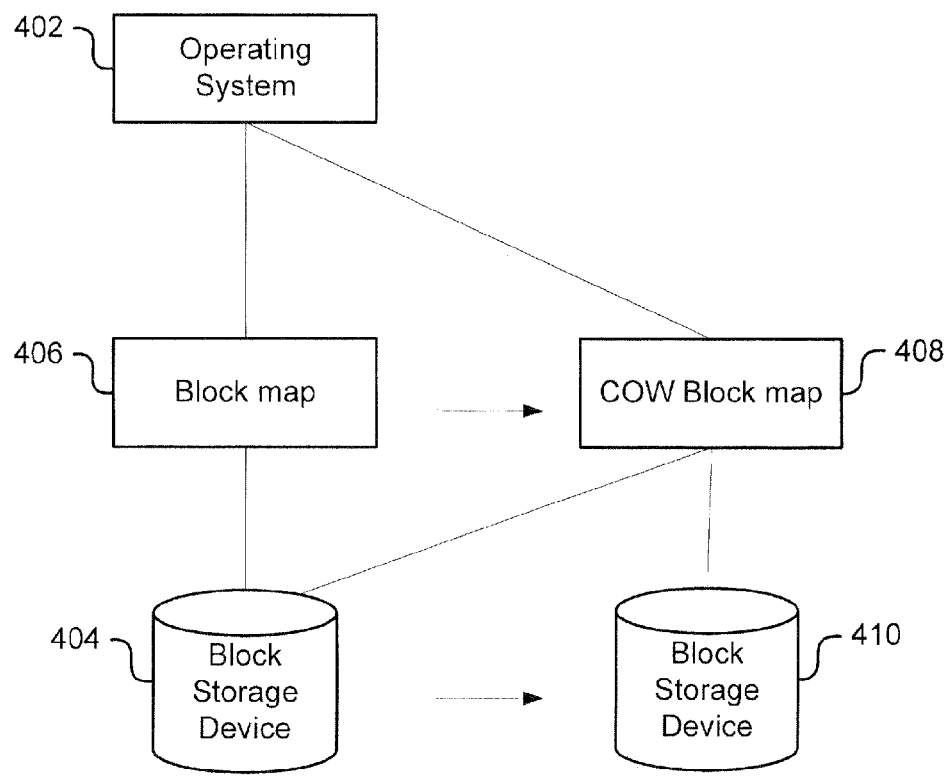
FIG. 4 shows a schematic diagram depicting aspects of an example method for capturing data in accordance with at least one embodiment.

FIG. 4 shows a diagram representing one way in which data set captures may be taken. In FIG. 4 an operating system 402 has access to a block storage device 404. It should be noted, however, that hypervisors (virtual machine managers) may also have access to the block storage device 404 in various embodiments that utilize virtualization. The block storage device 404 may be virtually or physically mounted to a computing machine (virtual or physical) on which the operating system executes. To access the block storage device 404, the operating system 402 may utilize a block map 406. The block map 406 may be a mapping of blocks of data to locations of the block storage device 402. In an embodiment where the block storage device is a physical hard drive, the block map 406 may associate data blocks with physical locations of the block storage device. In embodiments where the block storage device 404 is a virtual block storage device, the block map 406 may map blocks of data to virtual locations of the block storage device 404.

In an embodiment, as illustrated in FIG. 4, when a capture of a data set is stored by the block storage device 404, a copy on write (COW) block map 408 may be generated. The COW block map 408 may be a copy of the block map 406 at a time of the capture. After the capture, when a write is issued to the block storage device 404, if the write will affect an existing data block, the existing data block is copied to a second block storage device 410 and the COW block map 408 is updated to point to the location in the second block storage device 410 instead of the original location in the block storage device 404 at the time of the capture. In this manner, only data that has changed since the capture need be copied to the second block storage device 410. Additional captures may be made in the same or in a similar manner. Variations of the process illustrated in FIG. 4 are also considered as being within the scope of the present disclosure, including existing variations on copy on write techniques.

Various techniques for managing data set capturing may be used. For example, in an embodiment, data set captures are performed according to a capture schedule, which may be according to a periodic schedule, such as every ten minutes. A capture of the data set may be made at times specified by the schedule. Each capture may be made by recording changes made to the data set since the last capture was completed. In this manner, a volume may be reconstituted to a particular point in time corresponding to a capture by constructing the data set using all captures made at and before the particular point in time. High capture frequency may be achieved using this technique (and variations thereof) because, the higher the frequency at which captures are taken, the lower the number of changes to the data set that are possible. In other words, the less time between captures, the less time each capture takes.

Captures may also be taken based at least in part on various triggers. For instance, each write may trigger a capture. As discussed below, a write journal may be used to take a capture at every write. A number of input/output operations may also trigger a capture. A certain amount of data having been changed since a last capture is another example of a condition that may trigger a capture. Generally, any set of one or more conditions may trigger a capture when fulfilled. Further, the triggers may be configurable by various users, such as by customers of a virtual resource provider. Customers may be provided the ability through an application programming interface (API) or other interface to specify the conditions for when captures should be taken. For instance, a customer may specify that a capture should be taken every n writes (n being an integer). Data set captures may also be provided as a service and customers of the service may selectively choose when captures should and should not be taken. A virtual resource provider may charge customers based on one or more factors including, but not limited to, the number of captures taken, the amount of data captured, the number of writes captured, an amount of time capturing is "turned on" by the customer, and the like.

Captures may also be taken without knowledge of the customers or other users of the data sets being captured. A virtual resource provider may, for instance, capture data sets of customers in a manner that is not apparent to the customers. If the customer exhibits behavior (i.e. use of resources) that indicates illegal activity and/or activity that violates one or more terms and conditions to which the customer agrees, captures may be examined to confirm such activity to enable the virtual resource provider to take appropriate action, such as alerting authorities, revoking resources, and the like. As another example, if a customer contacts the virtual resource provider with a complaint or concern, captures may be analyzed to attempt to determine a reason for the customer complaint or concern. Analysis of a capture may, for example, indicate that the customer allowed its resources to be compromised.

Figure 5:
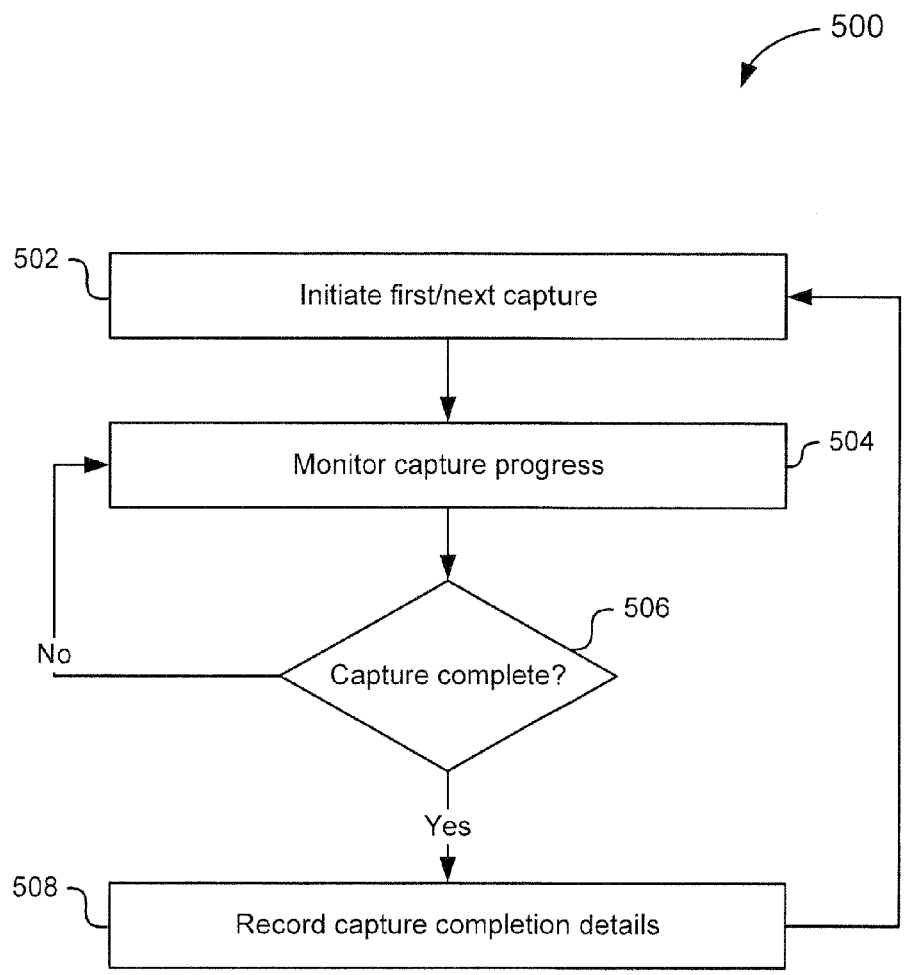
FIG. 5 shows an illustrative example of a process for capturing data sets in accordance with at least one embodiment.

While taking data set captures according to a schedule can be useful for various purposes, it is possible that the captures do not show evolution of the data set with fine enough granularity. For example, it is possible that malicious code may be installed on a system, executed, and removed during a time period between captures. FIG. 5 accordingly illustrates a process 500 for capturing data sets with high frequency. Some or all of the process 500 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. The process 500 may, for instance, be performed by the virtual data store service 204 described above in connection with FIG. 2 and/or a hypervisor running on a physical computer system hosting a virtual machine. The code may be stored on a computer-readable storage medium, for example, in the form of a computer program comprising a plurality of instructions executable by one or more processors. The computer-readable storage medium may be non-transitory.

In an embodiment, the process 500 includes initiating a capture 502. The capture may be initiated in any suitable manner. For example, an automated process may initiate the capture. Initiating the capture may include sending an instruction to a component of a computing system that is operable to orchestrate data set captures. As just one illustrative example, in an embodiment utilizing an environment such as that illustrated in FIG. 3, information indicative of an instruction to take a snapshot may be inserted into one or more request streams according to embodiments of the disclosure of U.S. application Ser. No. 12/975,269 entitled "Techniques for Capturing Data Sets," and filed on Dec. 21, 2010, now U.S. Pat. No. 8,438,247, noted above and incorporated herein by reference.

When the capture is initiated, the progress of the capture may be monitored 504. Monitoring the capture may include obtaining or waiting for information indicating that the capture has finished. For example, an application that initiated the capture may be programmed to wait for an acknowledgement that the capture has been completed. Monitoring the capture progress may also include polling a resource operable to indicate whether the capture has completed. A determination may accordingly be made 506 whether the capture is complete. If it is determined 506 that the capture is not complete, then the capture progress may be monitored 504 accordingly. The capture may be monitored in this manner, repeatedly checking whether the capture has completed, until a determination is made 506 that the capture is complete. In an embodiment, when it is determined that the capture is complete, capture completion details may be recorded 508. The capture completion details may include information indicating when the capture was made, where the capture is stored, and other information that may be useful, such as an identifier of the volume that was captured, the number of the capture in a series of captures, and the like. The completion details may be recorded in any suitable manner, such as in an administrative log accessible by one or more computer systems that may utilize the capture completion details, such as to provide forensic functionality in accordance with the present disclosure.

In addition, when it is determined that the capture is complete, the next capture may be initiated 502 and the process 500 may repeat. Initiation of the next capture may occur at any suitable time, such as immediately after determining that the previous capture was determined to be complete or after some time period, which may be predetermined or based at least in part on one or more other factors. While illustrated in FIG. 5 as occurring subsequent to recordation of the capture details, initiation of the next capture may be performed concurrently with recording the capture completion details.

Other variations of the process 500 (or other processes described herein) are considered as being within the scope of the present disclosure.

Figure 6:
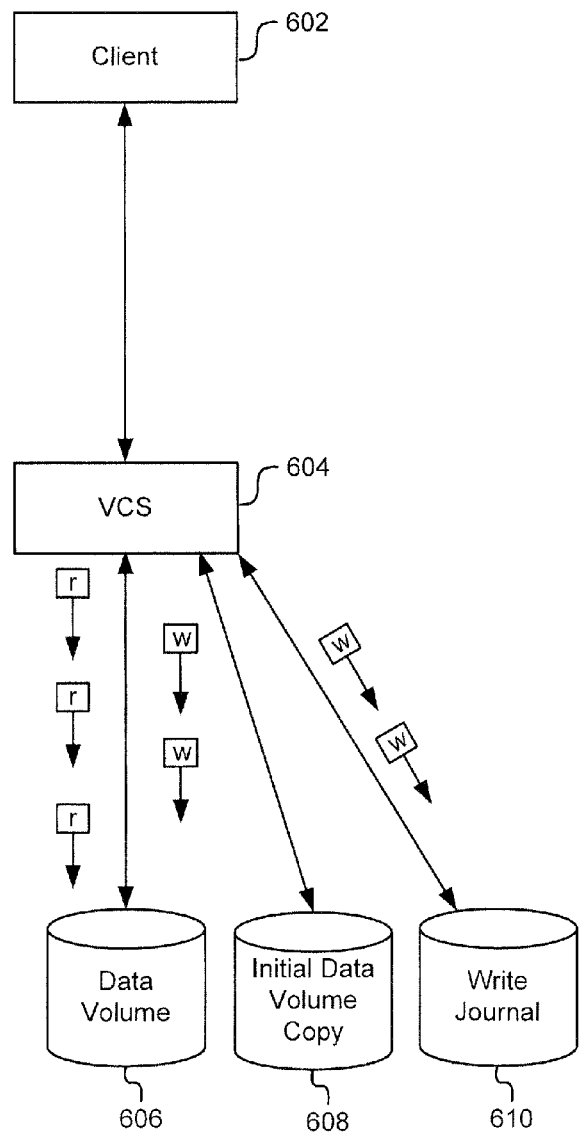
FIG. 6 shows a schematic diagram depicting an example process for capturing data sets in accordance with at least one embodiment.

In the example of FIG. 5, each data set capture is initiated as soon as the last capture has finished. In this manner, greater frequency is achieved than would be practical using a schedule. Other ways of capturing data sets may also be used. FIG. 6, for example, shows an illustrative example of a way data set captures may be performed at maximum frequency. In particular, as illustrated in FIG. 6, a capture is taken for each mutation of the data set.

In FIG. 6, a client 602 interacts with a virtual computing system (VCS) 604. The client may remotely access the VCS 604 over a network, such as a public communications network (e.g. the Internet), to operate the VCS 604. As another example, the client 602 may be another VCS, such as a VCS in a local data store that acts as a web server that communicates with the VCS 604. Generally, the client may be any device, physical or virtual, able to interact with the VCS 604. It should be noted that a client 602 accessing a VCS is provided for the purpose of illustration of a particular embodiment, but that variations are also considered as being within the scope of the present disclosure. For example, the process illustrated in FIG. 6 may be performed by a VCS or physical computing system without communication with a client.

In the particular embodiment illustrated in FIG. 6, the VCS accesses a data volume 606. The data volume 606 may be, for instance, an attached virtual block storage device (possibly implemented by multiple physical volumes) or a physical block storage device. An initial copy 608 of the data volume may be made at some point in time. The initial copy 608 may be stored separately from the data volume 606, for example, for use as backup in case of failure of the data volume 606. As illustrated, the client 602 interacts with the VCS and the VCS issues read and write requests accordingly. For example, the client 602 may instruct the VCS to obtain and provide data from the data volume 606. One or more read requests may be made accordingly and the VCS 604 may receive the requested data from the data volume 606 and provide the requested data to the client 602. As another example, the client 602 may instruct the VCS to add, update, or delete data in the data volume 606. The client 602 may, for instance, instruct the VCS 604 to store information provided by a user of the client 602 or from a user of a client of the client. The VCS 604 may issue write requests to the data volume 606 accordingly. While not illustrated for the sake of simplicity, acknowledgements may be issued from the data volume 606 to the VCS 604 and/or from the VDS 604 to the client 602.

In an embodiment, when write requests are issued to the data volume 606, corresponding write requests are issued to the write journal 610. Thus, when data is written to the data volume 606, the same data is written to the write journal 610. For instance, when a block is written to the data volume 606, the same block may be written to the write journal 610. The write journal may sequentially store the written blocks with timestamps. The write journal may be stored in a virtual data volume that is able to grow without bound (such as by adding physical volumes to the virtual volume when additional storage space is needed). In this manner, use of the initial data volume copy and the write journal allows reconstruction of the data volume for each of the mutations of the data volume. As an alternative, the write journal may be a circular buffer of a size less than the size of the data volume 606. When the buffer fills and a new block is to be written to the write journal 610, the write may be made using storage space allocated to the currently oldest block in the buffer. The write journal may be a COW buffer so that, when a block is overwritten, the block is written to the initial volume copy 608 (or another copy). In this manner, use of the initial volume copy 608 (possibly updated since its creation) and the write journal 610 may be used to reconstruct the data volume 610 for each mutation of the data volume for some number of mutations that are able to be stored in the write journal 610.

The write journal 610 may be configured with a write queue and an undo queue for use in provisioning data volumes according to selected capture times which may go forward or backward in time relative to an earlier selected capture time. When a write to the write journal is instructed, the data in the block that is being written may be written to the undo queue before committing the write to the write queue. In this manner, the undo queue may be accessed to change a data volume back in time and the write queue may be accessed to move the data volume forward in time.

Figure 7:
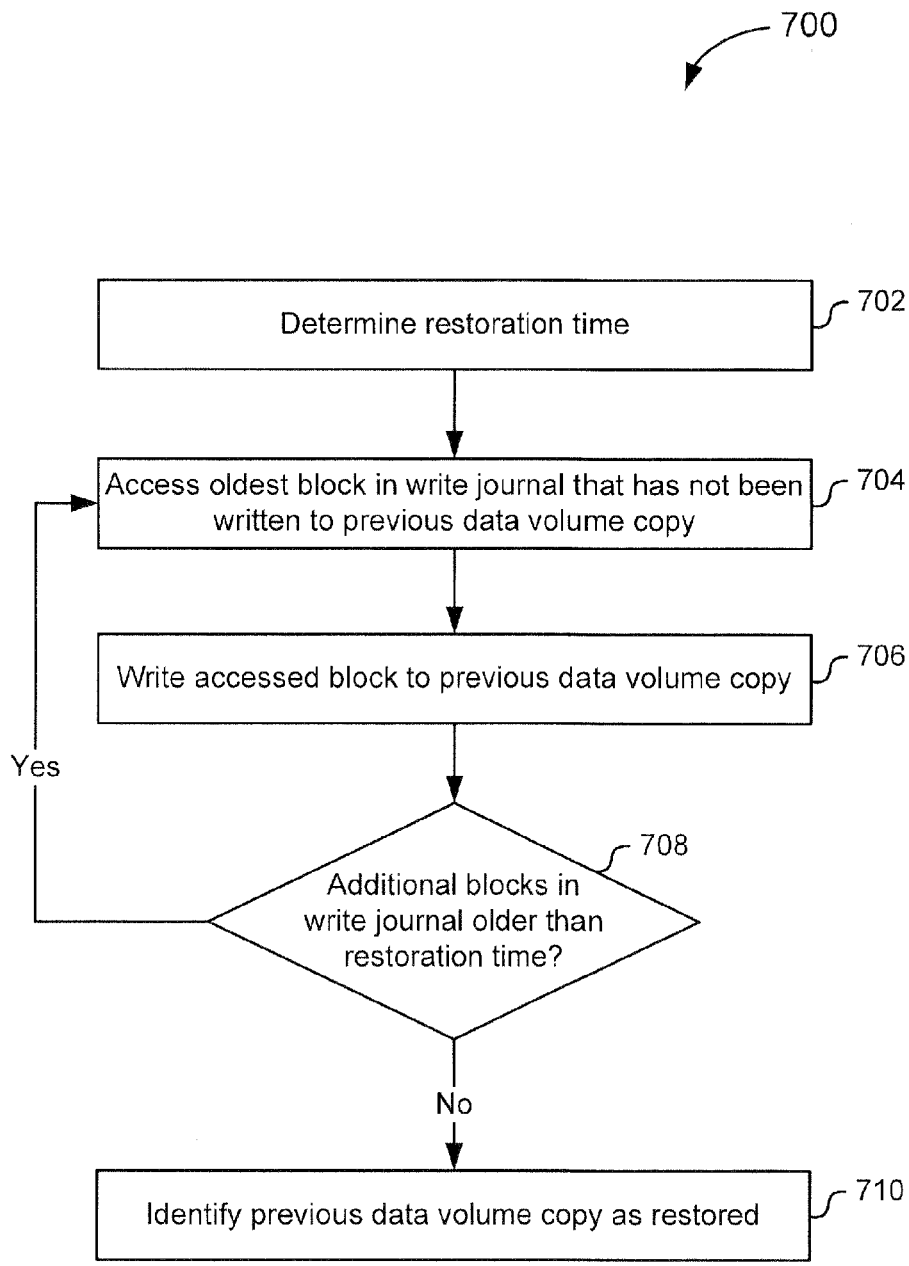
FIG. 7 shows an illustrative example of a process for restoring a data volume using a write journal in accordance with at least one embodiment.

FIG. 7 shows an illustrative example of a process 700 which may be used to reconstruct a data volume from a previous copy of the data volume and a write journal. The process 700 may be performed by any suitable device, such as a device working in connection with operation of the virtual data store service 204 described above in connection with FIG. 2. Returning to FIG. 7, in an embodiment, the process 700 includes determining 702 a restoration time, which may be a user-specified time or may be specified in any suitable manner, such as by an automated process. A user may, for example, wish to view the state of the data volume at a particular time, such as around a time a security event (security breach, e.g.) occurred, a malfunction occurred, and the like. The user may request the particular time in various ways, such as illustrated below. The process 700 may also include selecting, from multiple copies of the data volume corresponding to different times, the previous copy of the data volume as the copy that is the most recent copy that is older than the determined restoration time.

To restore a volume to the determined restoration time, in an embodiment, the oldest block in the write journal that has not been written to the previous data volume may be accessed 704. For instance, the write journal may include time stamps for blocks and the time stamps may be used to identify the block that has not been written to the previous data volume copy. Once accessed, the block may then be written 706 to the previous data volume copy. As an alternative, the writes in the write journal may be made to the previous data volume until the previous data volume is in a state corresponding to the determined restoration time. A determination may then be made 708 whether there are additional blocks in the write journal that are older than the restoration time. The determination may be made by comparing one or more time stamps of one or more appropriate blocks in the write journal with the restoration time. If it is determined that there are additional blocks in the write journal that are older than the restoration time, the oldest block in the write journal that has not been written to the previous data volume copy may be accessed 704 and written 706 to the previous data volume copy. This process of accessing 704 the oldest block in the write journal that has not been written to the previous data volume copy and writing 706 the block to the previous data volume copy may continue until a determination is made that there are no additional blocks in the write journal older than the restoration time. When such a determination is made, the previous data volume copy may be identified 710 as restored. For example, an application in the block data service 204 in FIG. 2 may be sent a message that the volume has been restored and is, therefore, available for mounting to a computing instance (virtual or physical).

Variations of the process 700 are considered as being within the scope of the present disclosure. For example, FIG. 7 shows a process where blocks are sequentially accessed from the write journal and written to the previous data volume copy. Multiple, even all, blocks may be accessed at one time and then written in some embodiments. Generally, any way of reconstituting the previous data volume copy with the appropriate blocks from the write journal may be used. In addition, FIG. 7 shows a process for writing data blocks from a write journal to a previous data volume copy. However, similar processes may be used in addition or as an alternative. For instance, to put a previous data volume copy in an earlier state, the write journal may be used to undo writes that were made after a specified time. Time stamps in the write journal may be used to identify such blocks. Thus, the process 700 may be modified to identify blocks after a particular time and, instead of writing the blocks to the previous data volume copy, undo the writes that were made.

Figure 8:
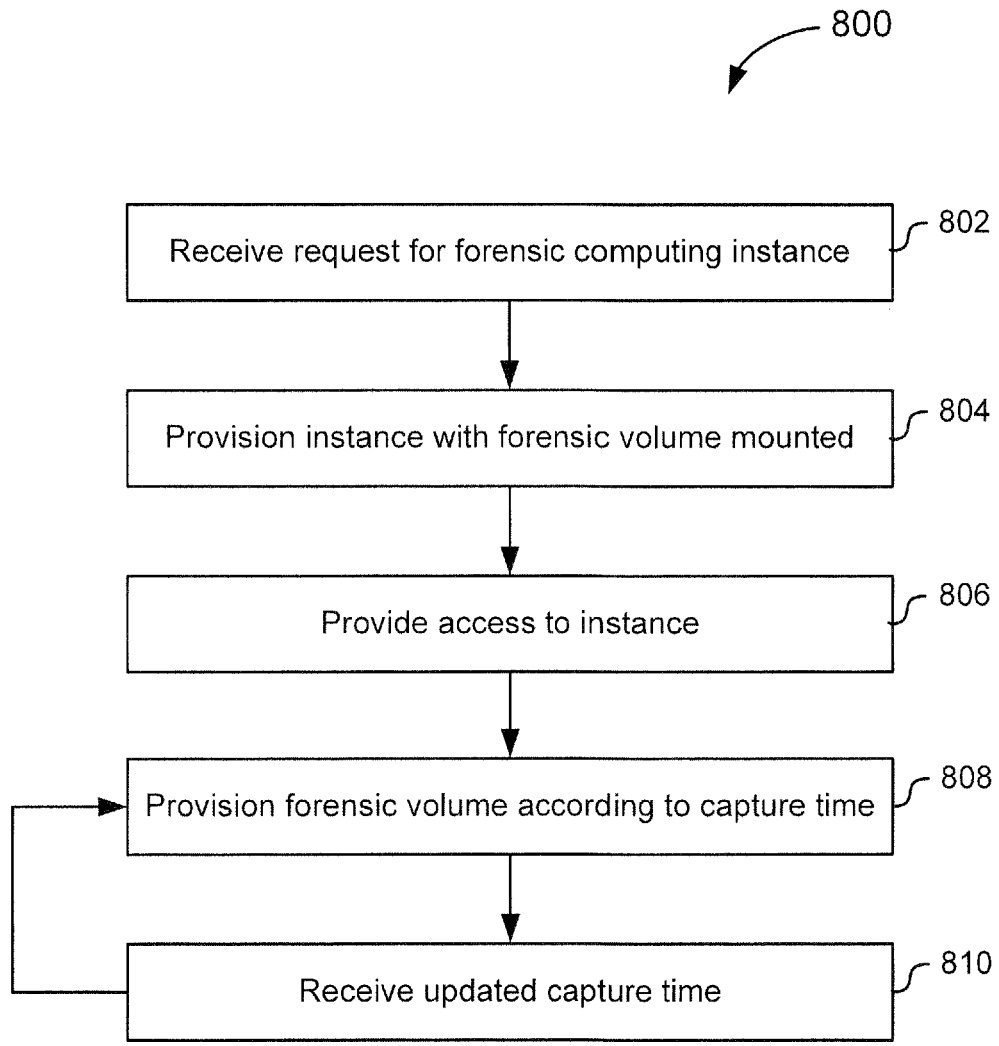
FIG. 8 shows an illustrative example of a process for providing an ability to forensically analyze a data volume at various states in accordance with at least one embodiment.

As discussed, various embodiments of the present disclosure allow users to forensically analyze data volumes. FIG. 8, accordingly, shows an illustrative example of a process 800 for providing users the ability to access a data volume at various states of its history. The process 800 and variations thereof may be performed by any suitable device or combination of devices, such as the block data store service 204 described above in connection with FIG. 2. However, it should be noted that the process 800 may be performed by other computer systems or combinations of computer systems in environments different from that illustrated in FIG. 2. Generally, the process 800 and variations thereof may be performed in any environment where a user accesses a data volume at different states of the volume's evolution.

In an embodiment, the process 800 includes receiving 802 a request for a forensic computing instance. A forensic computing instance may be a computer system, virtual or physical, having access to a data volume. The computing instance may be, for example, a virtual computer system that will have the data volume attached. In response to the request, a computing instance with the forensic storage volume mounted may be provisioned 804. Provisioning the computing instance may include generating a workflow comprising steps for provisioning the instance, such as identifying and preparing appropriate hardware, loading an appropriate operating system, booting the computing instance, and the like.

In an embodiment, when the computing instance has been provisioned, access to the provisioned computing instance is provided 806. Providing 806 access to the provisioned computing instance may include making the computing instance available to a user for control of the instance by a user. The user may, for example, be allowed to control operation of the computing instance via a remote web service or other API. Providing access may include configuring one or more computer systems to allow access via the API. For instance, the service control plane 206 may be configured to allow access to the computing instance. Generally, any way of allowing a user to access the provisioned computing instance or information about the provisioned computing instance may be used. In addition, the computing instance may be specially configured for forensic analysis. As described below, the user may change the state of the volume according to various capture times. Accordingly, the computing instance may be configured to avoid an operating system disk cache from caching data from the data forensic storage volume and/or ensuring that, when the forensic storage volume is updated to correspond to a different capture time, any operating system disk cache is consistent with the changed forensic storage volume. Such may be accomplished in various ways, such as by modifying standard low-level small computer system interface (SCSI) protocols, by updating cached blocks when blocks of the forensic storage volume are updated, and the like.

The process 800 may also include provisioning 808 the forensic storage volume from a capture of a data set at a particular time, which may be user-specified. Various techniques for preparing the forensic storage volume may be used, including techniques described above and variations thereof. For example, the forensic storage volume may be prepared by processing a write journal and performing and/or undoing writes accordingly. Generally, any method of preparing a volume for the computing instance according to capture information may be used.

While accessing the provisioned computing instance, the user may wish to change the state of the attached data volume. For example, the user may use the provisioned computing instance to view information about the volume at a certain time and wish to see how the data volume changed since an earlier time or at a later time. Accordingly, in an embodiment, an updated capture time may be received 8810. The updated capture time may be earlier or later than the capture time for which the data volume of the computing instance that was previously provisioned.

When the updated capture time is received, in an embodiment, the forensic storage volume is provisioned 808 to have a state corresponding to the received updated capture time. For instance, if captures were taken using a write journal, writes may be performed and/or undone according to the journal. Modifying the forensic storage volume may be done in other ways. For instance, in some cases, it may be more efficient to generate a new volume from an appropriate capture of the data set of the forensic storage volume. In this manner, modifying the forensic storage volume of the instance may include replacing the previous forensic storage volume with another forensic storage volume that corresponds to the previous forensic storage volume in a different state corresponding to the updated capture time. Generally, any way of providing a forensic storage volume having a state corresponding to the capture time may be used.

As illustrated in FIG. 8, once the forensic storage volume has been modified, access to the computing instance is again provided 804, such as in a manner described above. This process may continue as the user specifies different capture times in order to analyze how the volume changed over time. As the user selects new capture times, access to a computing instance having access to a volume with a state corresponding to the selected capture times may be provided to the user accordingly.

Variations of the process 800 considered as being within the scope of the present disclosure should also be noted. For instance, FIG. 8 shows an illustrative example of a process that includes provisioning a computing instance with a forensic storage volume mounted. Such actions are especially useful in remote computing service environments, such as illustrated in FIG. 2. However, other ways of providing access to a forensic storage volume with a state corresponding to a user-specified capture time may be used. For example, a computing instance may be already provisioned and, if the operating system allows, the forensic storage volume may be dynamically attached to the provisioned instance. As just one example, the computing instance may be provisioned using another volume and the forensic storage volume may be a second volume for the computing instance. As the user updates capture times, the forensic storage volume may be updated accordingly. Should such be required by an operating system of the computing instance, for each new capture time, the volume may be detached from the computing instance, updated to have a state corresponding to the capture time, and then reattached to the computing instance.

Other variations are also possible. For instance, a user may wish to return a data volume to a state that the user has already accessed. Depending on the particular method used to restore a volume to a particular state, restoring the volume may take time and resources. Accordingly, various embodiments may utilize strategies for reducing the time and/or resources necessary to return a volume to a state that a user has already accessed. For instance, different states of a volume being analyzed forensically may be cached using various caching techniques. For example, for each of a plurality of states of the volume, storage space may be allocated to the volume state. For instance, if the volume is a virtual storage volume, a copy of the volume at one state may be stored using a set of storage locations (e.g. a set of blocks of one or more block storage devices) and a copy of the volume at another state may be stored using a different set of storage locations. To reduce the amount of storage space needed, stored data common to both states may be stored in a common set of locations. Use of such (and other) caching techniques allows for access to different states of a volume without having to recreate the volume at a particular state multiple times. In addition, various techniques to improve performance may be used. For instance, caching techniques may be used to anticipate states that are likely of interest. As an example, if a security event (e.g., breach) or other event is detected, copies of the volume at different states close in time to the event may be cached to provide improved performance to a user that may wish to access the volume at the various states. Other techniques may also be used.

In addition, the processes described above may be modified to take advantage of various different capturing techniques. As discussed above, differencing volumes may be used to capture data sets. When a restoration time is specified, a differencing volume corresponding to the restoration time may be mounted to a forensic computer system. The differencing volume may be, for example, the most recent differencing volume that has a time stamp the same as or older than the specified restoration time. Mounting the differencing volume may include mounting all ancestor differencing volumes to the forensic computer system. The forensic volume may read data from a capture using various differencing volume techniques. For example, the forensic computer system may look to the differencing volume for data and, if the differencing volume does not have the data, look to the parent of the differencing volume and, if necessary, looking to other ancestors of the differencing volume. Changing the state of a forensic volume comprised of one or more differencing volumes may include changing the differencing volume(s) that is/are mounted to the forensic computer system.

Figure 9:
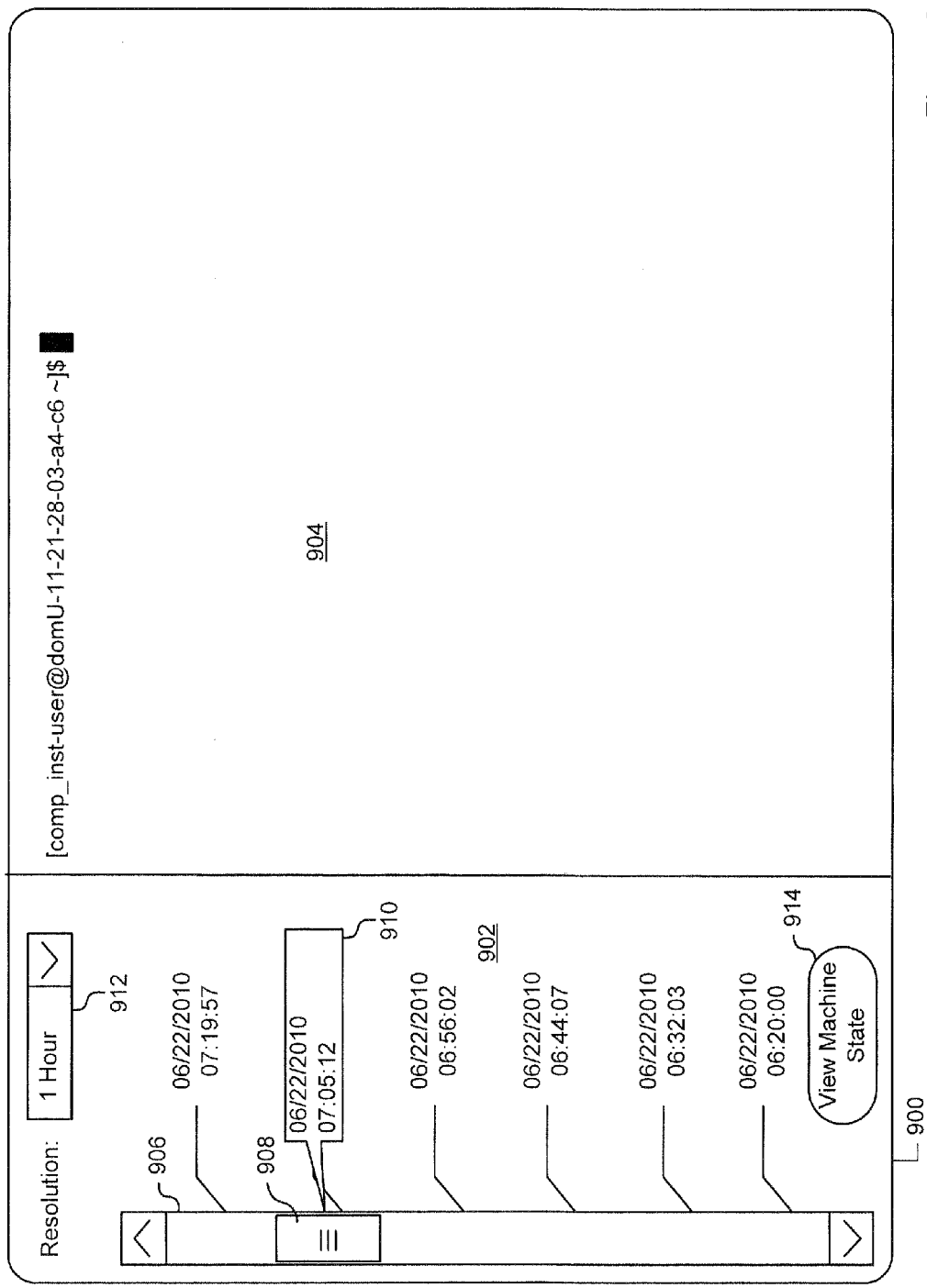
FIG. 9 shows an illustrative example of a graphical user interface for providing access to a forensic data volume in accordance with at least one embodiment.

FIG. 9 shows an illustrative example of a graphical user interface (GUI) 900 for forensically analyzing a data volume that has been captured one or more times in accordance with various embodiments. The GUI 900 illustrated in FIG. 9 and variations thereof may be presented to a user on a display device of the user in order to allow the user to analyze the volume. As shown in FIG. 9, the GUI 900 includes a left pane 902 and a right pane 904, although other configurations are within the scope of the present disclosure. The left pane, in an embodiment, includes various interface controls that enable the user to specify a capture time at which the user desires to view a data volume. For example, as illustrated, the GUI 900 includes a slider 906 which includes a moveable thumb 908 and operates in a manner similar to a scroll bar. In particular, positions on the slider correspond to times and a user may manipulate the position of the thumb 908 relative to the remainder of the slider 906 to select capture times. In one embodiment, every position on the slider corresponds to a capture time at which a capture of the data set of the volume was captured. The user may move the thumb 908 to a position to designate a corresponding capture time. When the user uses the slider 906 to select a capture time (such as by releasing the thumb 908 with a mouse or other input device), an appropriate computer system, such as described below in connection with FIG. 10, may begin modifying a forensic volume according to the selected capture time and, if applicable, updating a block map for the forensic volume.

As illustrated in FIG. 9, the GUI may include indications of various capture times available for selection. As shown, the indications are lines extending from the slider with a date and time a corresponding capture was taken. In this manner, the user knows where to move the thumb 908 to select a particular capture. In addition, as shown in the illustrative example of FIG. 9, a balloon 910 or other graphical element may extend from the thumb 908 or otherwise to indicate a particular capture time corresponding to the current position of the thumb 908. As the user moves the thumb 908 relative to the slider 906, values in the balloon may change accordingly to allow the user to pick a precise capture time. The thumb may be moved in various ways, depending on the hardware used. For example, the thumb may be moved with a mouse drag operation, a touchpad drag operation, a touch screen drag operation, using keyboard arrow keys, and the like. The indications of capture times as displayed by the GUI, for some or all views, may not be exhaustive. For example, between two displayed indications of corresponding capture times, there may be one or more additional capture times that do not have corresponding capture times displayed.

In an embodiment, the GUI allows the user to select a resolution for the slider 906. In this illustrative example, a drop down box 912 is available to the user to select one of a plurality of possible resolution values. In the example shown, a resolution of one hour is shown as selected which, in this example, indicates that capture times for captures occurring in approximately an hour time span are selectable using the slider 906. If the user wants to use the thumb more accurately, he or she may select a shorter time period. To allow for a larger number of times to select from, the user may select a longer time period. The user may select capture times that do not correspond to currently displayed positions on the slider 906 in various ways. For example, the user may select a longer time period using the drop down box 912, move the thumb to a position that is proximate to a position that would correspond to a desired time, and then use the drop down box 912 to select a shorter time period. As another example, a slider may be configured in the GUI such that, when the thumb 908 is moved close to a terminal end of the slider, the slider is updated to change the correspondence between slider positions and capture times. For example, using FIG. 9 as an example, moving the thumb 908 close to the lower end of the slider 906 may cause positions on the slider to correspond to capture times earlier than those that corresponded to positions on the slider prior to the thumb moving close to the lower end. Moving the thumb 908 may cause a similar effect with respect to later capture times. Generally, numerous variations and enhancements are considered as being within the scope of the present disclosure.

As discussed, variations of the present disclosure allow for forensic analysis of a data volume at different capture times. In the illustrated example of FIG. 9, the user may utilize a slider to select various capture times, although other GUI features may provide the same or similar functionality. As illustrated, the user may submit a selected time by selecting a submit button 914 or other appropriate GUI element or in another way (such as selecting a keyboard "enter" button). Selecting the submit button 914 may cause a computer system of the user to provide the selected capture time to a computer system configured to provide access to the data volume at a state corresponding to the selected capture time. The capture time may be sent, for example, to the block data store service 204 of FIG. 2 or another suitable service.

Upon receipt of a capture time, in an embodiment, access is provided to a computing instance that has access to a data volume that has been configured according to the received capture time. In an embodiment, the computing instance is remote from the user and accessible via a communication network (such as the Internet), although the computing instance may be a computing device used by the user. In this latter case, providing access to the computing instance may include configuring the user's computing device to have access (local or remote) to the data volume. In any event, when the user has access to the data volume, in an embodiment, an interface for interacting with the volume appears in the right pane 904.

The interface in the right pane may be any interface for interacting with one or more services that provide access to the computing instance. As illustrated in FIG. 9, the interface is a PuTTY terminal with a command line interface, although different interfaces may be used. For example, the interface may be a GUI which may be a GUI of an operating system of the computing instance. The GUI may be provided by the user's computing device or by a remote device using a XenDesktop and XenApp products available from Citrix Systems, Inc. In any event, the right pane, in an embodiment, is configured to enable navigation of the data in the forensic storage volume attached to the computing instance. For example, using the command line interface, the user may type a command to see a file-system directory of the forensic storage volume as it existed at the time of the snapshot. If using a GUI, the user may view the directory in a graphical manner. Generally, the user may be provided any way of accessing the data in the forensic storage volume at the time of the corresponding capture. As another example, the user may view applications installed on the operating system at the time of the capture, the state of a registry of the operating system at the time of the capture, and the like. In addition, the computing instance may include more sophisticated applications. For example, an application may show precisely the writes that were made including metadata about the writes, such as a timestamp. The computing instance may include an application that scans the data in the forensic storage volume for malicious, harmful, and/or other code. Generally, any manner of providing access to the data may be used.

Figure 10:
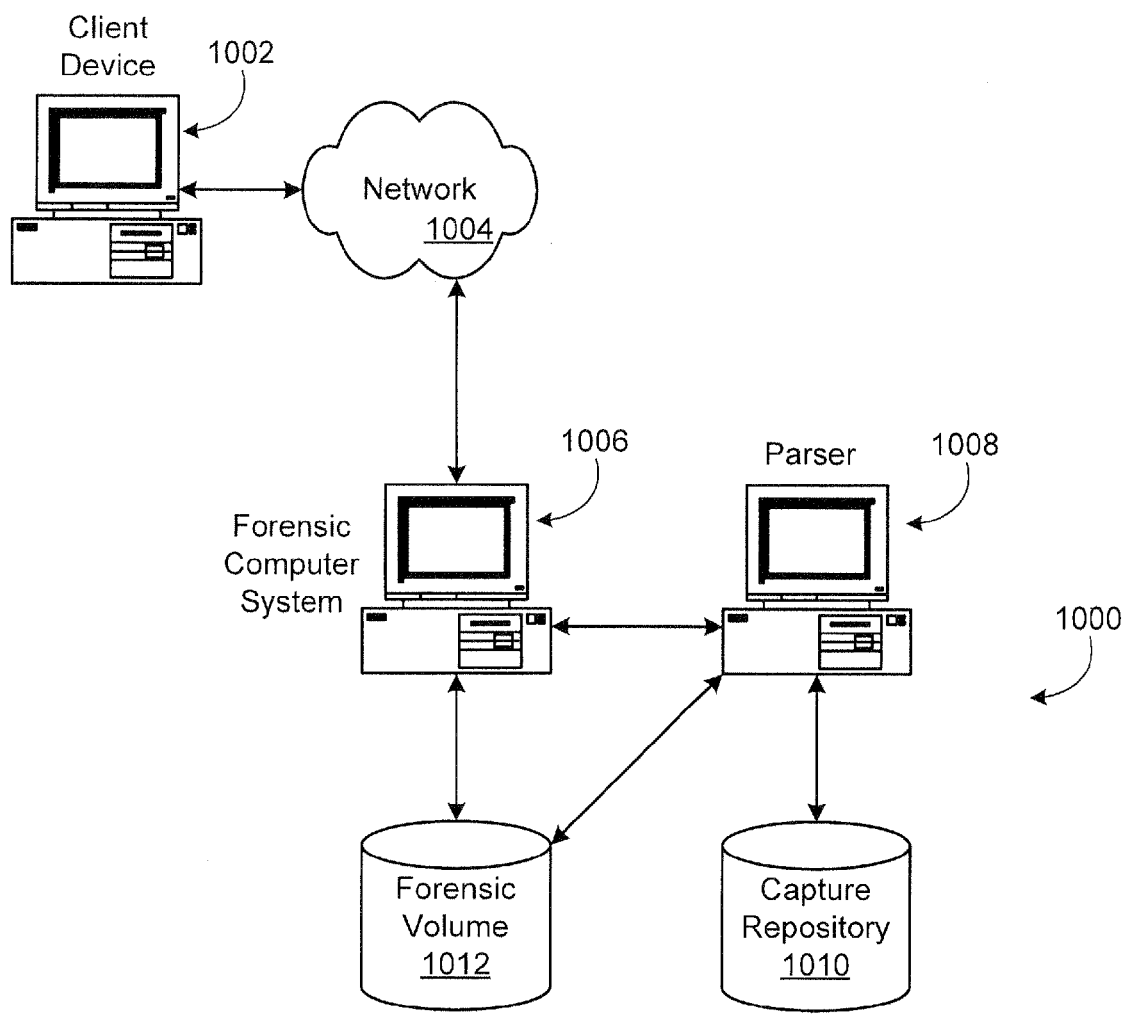
FIG. 10 shows an illustrative example of a system that may be used to provide users the ability to forensically analyze storage volumes in accordance with at least one embodiment.

FIG. 10 shows an illustrative example of a system 1000 that may be used to provide users the ability to forensically analyze storage volumes. The system may be part of a BDS service, such as the virtual data store service 204 described above in connection with FIG. 2. In an embodiment, the system 1000 is accessed by a client device 1002 over a network 1004, such as the Internet, an internal network of an organization, or combination of networks. The client may be a computing device of a customer of a virtual resource provider or, generally, a user. While not illustrated in the figure, the system 1000 may include various interfaces and control plane components that enable client interaction with the system 1000, such as those components described above in connection with FIG. 2.

The system, in an embodiment, includes a forensic computer system 1006 such as described above. The forensic computer system may be a physical computer system to which the client 1002 is allocated access or a virtual computer system that has been provisioned for the client 1002. The forensic computer system 1006 may interact with a parser 1008, which, in an embodiment, is a computer system or component of a computer system configured to access data set captures from a capture repository and use the captures to provision a forensic volume 1012, where the captures may be any suitable type of captures (differencing disk-based, write journal-based, and the like) and the forensic volume may be as discussed above. For example, the forensic volume 1012 may be a read-only volume that is accessible to allow users to access various views of the state of the forensic volume at different times. The parser 1008, for example, may be a virtual differencing disk parser. The parser 1008 may provision the forensic volume by changing a pointer to an appropriate differencing disk that corresponds to a selected capture time.

In an embodiment, a user of the client device 1002 utilizes an interface, such as the interface described above in connection with FIG. 9, to select capture times (restoration times). The forensic computer system 1006 may then instruct the parser 1008 to access a corresponding capture from the capture repository 1010 and provision the forensic volume 1012 from the accessed capture. Once provisioned, the client device 1002 can access the forensic computer system 1006 to access the provisioned forensic volume 1012, such as described above.

As noted, variations of the system 1000 are considered as being within the scope of the present disclosure. For example, FIG. 10 shows various components of the system implemented by different computing devices and different data stores. However, the functionality described above may be combined in a single computing device and/or the forensic volume 1012 and the capture repository 1010 may be combined in a single data store. Further, additional components (not pictured) may be included.

Other variations are also considered as being within the scope of the present disclosure. For example, a user may use the techniques described herein to restore a data volume to a particular state and may begin using this volume from the restored state. Generally, multiple volumes may evolve from a data volume's state at a particular time. Further, evolutions of evolutions may also evolve. Some or all of the various evolutions may be tracked according to the various embodiments described herein and used forensically—for example, to see how tuning applications changes results when starting with a particular data volume, to test how various precautions can facilitate avoidance of problems, and the like.

Other variations considered as being within the scope of the present disclosure include analysis of the meaning of various writes. For example, a file system type (e.g., NTFS, FAT, ext1, ext2, ext3, ext4, and the like) of a volume may be known in advance or may be ascertained through conventional semantic analysis. When combined with advance knowledge of the file system, various techniques may provide the user with more robust information. For instance, the user may be informed that certain writes at a certain time affected particular files, such as whether a write was part of a file deletion, creation, or modification. With this knowledge, the user can then more effectively examine the events relating to the data volume's mutation. Generally, the techniques of the disclosure may be used for a wide variety of purposes.

The various embodiments further can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for providing access to different states of a data set, comprising:
   under the control of one or more computer systems configured with executable instructions,
   storing a data set among a plurality of data blocks of a storage volume;
   performing write operations that change at least a subset of the plurality of data blocks;
   generating block-level captures of the data set, each block-level capture having a corresponding capture time and each block-level capture representing a state of the plurality of data blocks of the storage volume at the corresponding capture time;
   for a particular capture time corresponding to a particular state of the plurality of blocks and to a particular capture of the data set, using the particular capture to configure a forensic storage volume in a state corresponding to the particular state, the forensic storage volume hosted by a provider of a computer resource, a customer using an application programming interface (API) to specify information related to the particular capture time;
   providing, to a user, access to a computing device in a manner allowing the user to select a different capture time, the different capture time corresponding to a different capture and to a different state of the plurality of data blocks; and
   providing, to the user, access to the computing device, the computing device having access to the changed forensic storage volume.

2. The computer-implemented method of claim 1, wherein generating the block-level captures of the data set is performed according to one or more predetermined frequency parameters.

3. The computer-implemented method of claim 2, wherein generating block-level captures of the data set according to one or more predetermined frequency parameters comprises logging each write operation to a write journal.

4. The computer-implemented method of claim 1, wherein each capture is a representation of the storage volume that includes data blocks that have changed since a previous capture.

5. The computer-implemented method of claim 1, wherein providing access to the computing device in a manner allowing the user to select a different capture time includes providing a graphical user interface to the user that allows the user to select from a plurality of different capture times.

6. The computer-implemented method of claim 1, wherein the storage volume is a virtual storage volume implemented by a plurality of physical storage volumes.

7. A computer-implemented method for providing access to data set states, comprising:
   under the control of one or more computer systems configured with executable instructions,
   taking a plurality of block-level captures of at least one first storage volume during a time period, each block level capture corresponding to a state of the first storage volume at a corresponding capture time;
   configuring a forensic storage volume to have a state corresponding to the state of the first storage volume for a first capture time within the time period, the forensic storage volume hosted by a provider of a computer resource, the customer using an application programming interface (API) to specify information related to the particular capture time;
   reconfiguring the forensic storage volume to have a state corresponding to the state of the first storage volume for a second capture time within the time period; and
   providing access to a computing device that is configured to access the forensic storage volume in at least the state of the first storage volume for the first capture time and the state of the first storage volume for the second capture time.

8. The computer-implemented method of claim 7, wherein reconfiguring the forensic storage volume includes modifying the forensic storage volume according to one or more entries of a write journal.

9. The computer-implemented method of claim 7, wherein providing access to the computing device includes providing, to a user, an ability to select from a plurality of capture times and wherein reconfiguring the forensic storage volume is performed according to a user-selected capture time.

10. The computer-implemented method of claim 9, wherein, for a sequence of the plurality of capture times, corresponding captures differ by a predefined number of one or more blocks.

11. The computer-implemented method of claim 7, wherein, for each data block of the first storage volume at a particular capture time, data stored in the data block is stored in a corresponding block of a corresponding particular capture.

12. The computer-implemented method of claim 7, further comprising booting the computing device with the forensic storage volume.

13. A computer system for providing forensic access to a storage volume, comprising:
   one or more processors; and
   memory, including instructions executable by the one or more processors to cause the computer system to at least:
   obtain block-level captures of at least one storage volume during a time period, each block level capture corresponding to a state of the storage volume at a corresponding capture time;
   provide access to a computing device that accesses a forensic storage volume, the forensic storage volume being in a state corresponding to the state of the storage volume at a particular time, the forensic storage volume hosted by a provider of a computer resource, a customer using an application programming interface (API) to specify information related to the particular capture time;

receive selections of capture times; and reconfigure the forensic storage volume to have a state corresponding to the state of the storage volume for a second capture time when a selected capture time is received.

14. The computer system of claim 13, wherein for each data block of a particular capture corresponding to a particular capture time, data stored in the data block was stored in a corresponding data block of the storage volume at the particular capture time.

15. The computer system of claim 13, wherein obtaining block-level captures of the storage volume during the time period includes taking a sequence of captures, each capture in the sequence being initiated upon completion of a previous capture.

16. The computer system of claim 13, wherein obtaining block-level captures of the storage volume during the time period includes journaling every sequence of a predetermined number of writes to the storage volume during the time period.

17. The computer system of claim 16, wherein the predetermined number is one.

18. The computer system of claim 16, wherein journaling every sequence of the predetermined number of writes includes modifying a log of writes to the storage volume, the log configured to grow without a programmatically set bound.

19. The computer system of claim 13, wherein providing access to the computing device includes providing, to a user, an ability to select from a plurality of capture times and wherein reconfiguring the forensic storage volume is performed according to a user-selected capture time.

20. The computer system of claim 13, wherein the capture times correspond to captures taken according to a predetermined capture schedule.

* * * * *